United States Patent [19]

Spain, Jr.

[11] Patent Number: 4,653,190
[45] Date of Patent: Mar. 31, 1987

[54] DISPLACEMENT TRANSDUCER ACCOMMODATING EXTREME ENVIRONMENTAL CONDITIONS

[76] Inventor: Robert A. Spain, Jr., 4202 Directors Row, Houston, Tex. 77092

[21] Appl. No.: 478,835

[22] Filed: Mar. 25, 1983

[51] Int. Cl.$^4$ .................................................. G01B 5/02
[52] U.S. Cl. ................................. 33/125 R; 33/147 D; 33/344; 73/526; 73/430
[58] Field of Search ............... 33/1 H, 1 HH, 125 B, 33/125 R, 138 R, 147 D, 344; 73/431, DIG. 10, 493, 496, 526, 430, 516

[56] References Cited

U.S. PATENT DOCUMENTS

| | | | |
|---|---|---|---|
| 414,232 | 11/1889 | Lowe . | |
| 2,853,287 | 9/1958 | Draper et al. | 73/516 R |
| 2,860,215 | 11/1958 | Williams | 201/59 |
| 2,966,797 | 1/1961 | Brewer et al. | 73/88.5 |
| 3,271,564 | 9/1966 | Rosenfeld et al. | 235/151.32 |
| 3,477,132 | 11/1969 | Laurien | 33/126.6 |
| 3,500,547 | 3/1970 | Van Haagen | 33/143 |
| 3,553,842 | 1/1971 | Gerber et al. | 33/1 |
| 3,791,037 | 2/1974 | DiCiaccio et al. | 33/125 |
| 3,832,781 | 9/1974 | Flagg | 33/23 |
| 4,053,985 | 10/1977 | Spentzas | 33/1 |
| 4,057,904 | 11/1977 | Vrabel | 33/125 |
| 4,071,957 | 2/1978 | Sumption et al. | 33/174 |
| 4,181,960 | 1/1980 | Tateishi | 364/562 |
| 4,286,386 | 9/1981 | Long | 33/138 |
| 4,361,040 | 11/1982 | Taplin et al. | 73/516 R X |
| 4,443,888 | 4/1984 | Cutter | 33/125 R X |

Primary Examiner—William D. Martin, Jr.
Attorney, Agent, or Firm—Glaser, Griggs & Schwartz

[57] ABSTRACT

A displacement transducer for accurately detecting both linear and angular displacements and velocities, between objects moving relative to one another. The displacement transducer is structured to accurately operate under large gravitational accelerations and vibration extremes as well as minimize the adverse effects of environmental degradation upon the displacement transducer's performance.

7 Claims, 4 Drawing Figures

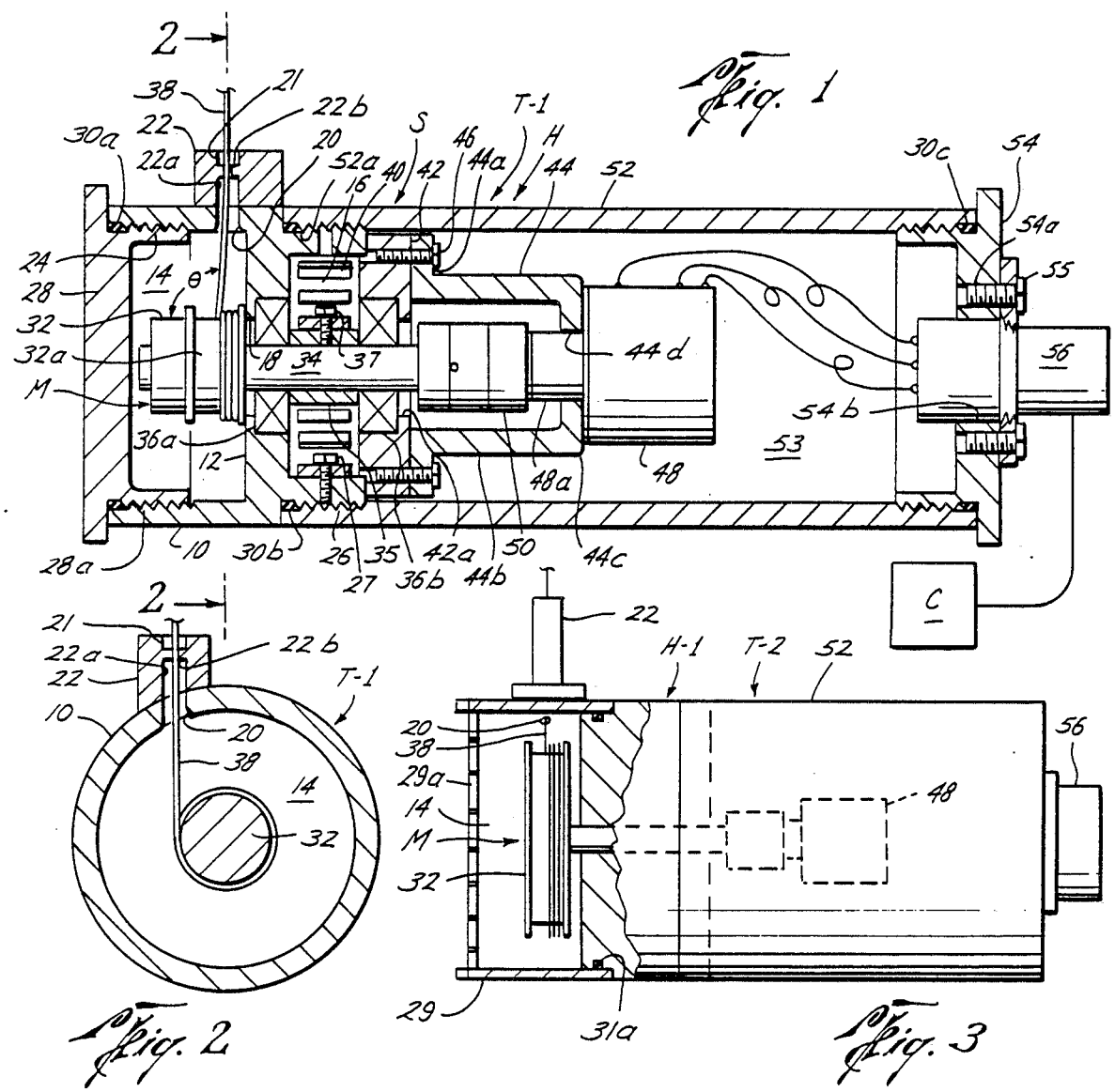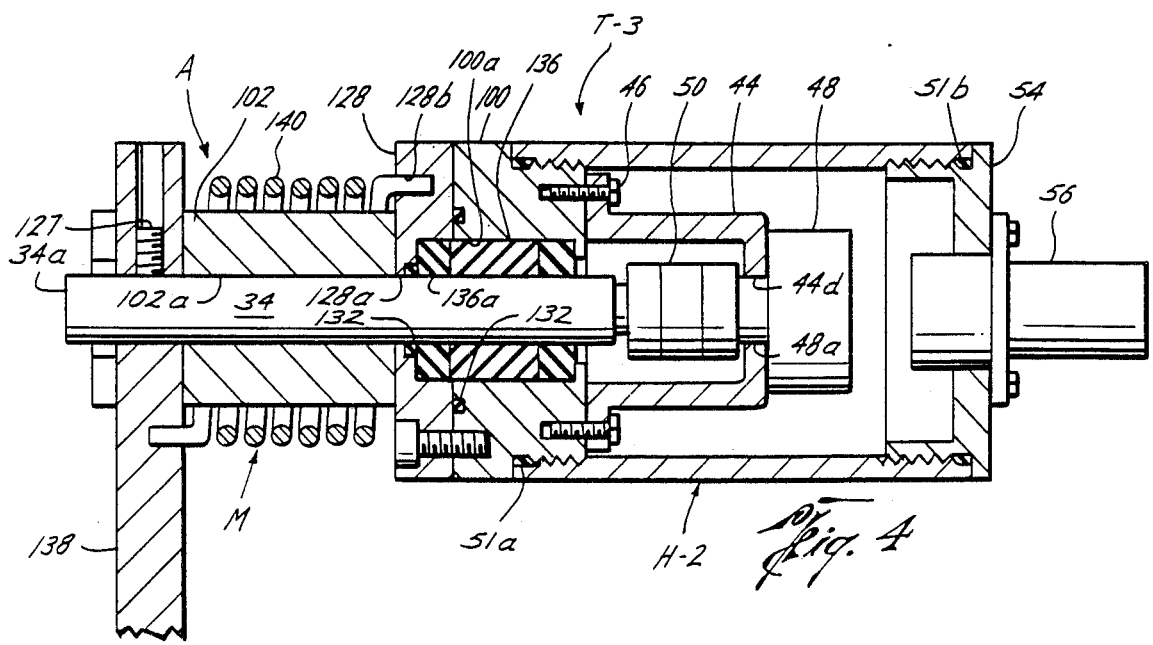

DISPLACEMENT TRANSDUCER ACCOMMODATING EXTREME ENVIRONMENTAL CONDITIONS

FIELD OF THE INVENTION

The field of this invention relates to devices used for the precision measurement of relative linear and angular displacement and velocities, particularly of the type capable of withstanding large gravitational accelerations, oscillations and extreme environmental conditions.

DESCRIPTION OF THE PRIOR ART

The utilization of displacement tranducers in the past, in adverse environmental areas, such as in the field of rocketry where high temperatures and forces are typically found, has been met with only limited success. Early cable operated displacement transducers utilized standard encapsulated power springs as a source of rewind energy. Gross inaccuracies in the manufacture of the steel cases of such springs resulted in dead bands, i.e. regions were no output signal is generated in response to the relative displacement between two objects. Additionally, such devices utilized potentiometers with long shafts which were subject to side loading on the potentiometer thus reducing its usable life expectancy and further reducing its accuracy and linearity.

The next generation of prior art displacement transducers adapted a constant torque spring motor which provided a constant torque throughout its excursion, and hence eliminated dead band. However, such devices had extremely short mean times between failures because of the increased number of parts. Typical of such constant torque displacement transducers are U.S. Pat. No. 2,966,797 and U.S. Pat. No. 4,057,904. It can be seen that such devices have a plurality of axes with interconnecting gear drives. Such plurality of axes and gear drives limit the accuracy of such devices when severe mechanical loading and environmental conditions are imposed on the apparatus. Moreover, the plurality of parts increases the maintenance as well as the difficulty of repair and shortens the operable life expectancy of such apparatus. Additionally, the bulky housing configuration of such devices further limits the flexibility of positioning such devices especially in rocket systems and the like where mounting space is a premium.

Certain U.S. Pat. Nos. 414,232; 3,553,842; and 3,832,781 all show axially aligned spools and motors; however, none of these devices provided the structural elements necessary to support, house and operate a displacement transducer apparatus under severe mechanical loading or extreme environmental conditions without adversely effecting the operation and accuracy of such device.

SUMMARY OF THE INVENTION

The displacement transducer of the present invention discloses a novel structural arrangement of a rotatable extensometer flexibly coupled with a precision signal encoder. The extensometer and signal encoder are ruggedly and uniquely supported in a frame to operably perform under adverse environmental conditions and extreme mechanical loadings.

BRIEF DESCRIPTION OF THE DRAWINGS

FIG. 1 is a longitudinal, sectional view of a first embodiment of the displacement transducer of the present invention;

FIG. 2 is a transverse, sectional view of FIG. 1, taken along line 2—2 of FIG. 1;

FIG. 3 is a longitudinal, partially sectional view of a second embodiment of the displacement transducer of the present invention; and FIG. 4 is a longitudinal, sectional view of a third embodiment of the displacement transducer of the present invention.

DESCRIPTION OF THE PREFERRED EMBODIMENT

The displacement transducer of the present invention is generally referred to in the drawings by the letter T. The transducer T includes an encapsulated displacement sensor S ruggedly mounted in a housing H to accurately detect the relative displacement between the transducer T and another object (not shown).

A first embodiment of the displacement transducer is designated T-1 in FIGS. 1-2. The housing H includes frame member 10 mated with an upper end cap 28 and a lower sleeve 52. The frame member 10 is preferably cylindrical in configuration although other shapes can be utilized to meet positioning requirements. Frame member 10 has a spool cavity 14 formed at one end thereof and a spring cavity 16 formed at the other end thereof. Spool cavity 14 and spring cavity 16 are separated by an interior septum 12 mounted substantially perpendicular to the longitudinal axis of the frame member 10. The septum 12 is formed having a central shaft opening 18 whereby spool cavity 14 communicates with spring cavity 16. The frame member 10 may be a machined piece of metal such as aluminum or an injected, molded plastic such as "RITON".

Frame member 10 further includes a portal 20 extending through frame member 10 into spool cavity 14. A guide block 22 having an internal bore 22a is mounted on the exterior surface of frame member 10 whereby the guide block bore 22a is concentric with portal 20 and in communication therewith. A constriction 22b partially extends into guide block bore 22a thus reducing the diameter of a portion of internal bore 22a.

The frame member 10 is internally threaded at a first end 24 within spool cavity 14. The frame member 10 is externally threaded at a second end 26, which is exterior of spring cavity 16.

The end cap 28 having a threaded end portion 28a threadably engages the threaded first end 24 of frame member 10. A sealing ring 30a is disposed between end cap 28 and frame member 10, such that when end cap 28 threadably engages frame member 10, spool cavity 14 is sealably enclosed.

Sleeve 52 having a threaded end portion 52a threadably engages the threaded second end 26 of frame member 10 to encapsulate the remaining portion of the displacement sensor S. A sealing ring 30b is disposed between the threaded connection of sleeve 52 and frame member 10 to inhibit inward fluid migration.

Sleeve 52 includes end piece 54 threadably engaged therewith enclosing cavity 53. A sealing ring 30c is disposed between the threaded connection of sleeve 52 and end piece 54 to inhibit inward fluid migration.

End piece 54 includes threaded openings 54a to receive fasteners 55. End piece 54 also includes opening 54b to receive a signal connector 56. Signal connector 56 is sealably mounted with end piece 54 using fasteners 55 to inhibit inward fluid migration. Signal connector 56 further transmits the output signal of the displacement sensor S to a processing circuit C.

The displacement sensor S includes an extensometer M axially mounted with a precision signal encoder 48. The extensometer M is rotatably mounted with frame member 10. The extensometer M includes a precision spool 32 and a motor shaft 34 attached thereto in longitudinal, axial alignment. Precision spool 32 is generally cylindrical in shape and has an annular surface with a uniform, precision diameter 32a.

The motor shaft 34 extends through shaft opening 18 of the septum 12 such that the precision spool 32 is mountable within the spool cavity 14. Precision spool 32 is a predetermined diameter larger than shaft opening 18. Precision spool 32 is securely mounted with motor shaft 34 a predetermined distance from septum 12 such that the spool 32 freely rotates in spool cavity 14.

Mounted between shaft 34 and shaft opening 18 is shaft bearing 36a. Such shaft bearing 36a may be a journal type bearing and may be made from "DELREN", 37 NYLATRON", "TEFLON" or the like or may be a ball bearing depending on the environmental parameters of temperature and the like. The bearing 36a centralizes motor shaft 34 and minimizes its frictional resistance to rotation thereabout.

The extensometer M also includes a displacement cable 38 having one end attached to the precision spool 32. Cable 38 provides means for measuring the relative linear displacement between two objects. The cable 38 forms a plurality of coils about the precision diameter 32a when in a generally retracted position discussed hereinbelow. The coils of cable 38 are disposed about the diameter 32a adjacent one to the other without overlapping. The cable 38 pays off spool 32 and passes through portal 20 and guide block bore 22a for attachment to a structural member (not shown) for which it is desirous to know the relative displacement and/or rate of displacement.

A potting sealant 21 is mounted in the annular space between cable 38 and guide block bore 22a. Potting sealant 21 also abutts guide block constriction 22b. Potting sealant 21 thereby inhibits fluid migration into spool cavity 14 and is similar in consistency to putty whereby sealing of bore 22a is accomplished yet sealable movement of cable 38 through bore 22a is still possible.

It should be noted that the portal 20 and guide block bore 22a are aligned tangentially with the precision spool diameter 32a as best shown in FIG. 2. It is necessary that the tangential relation exists to guide cable 38 off/on precision spool 32 uniformly such that the linear displacement of cable 38 bears a linear relationship to the angular rotation of spool 32.

Guide block bore 22a and portal 20 are positioned axially with respect to the longitudinal axis of precision spool 32 to limit the tracking angle $\theta$ cable 38 makes with precision spool 32 as seen in FIG. 1.

Relative displacement between a structural member (not shown) and transducer T-1 extends the cable 38 and causes spool 32 to rotate.

The extensometer M further includes a flat torque spring 40 mounted concentric with motor shaft 34 in spring cavity 16. One end of flat torque spring 40 is connected to frame member 10 with set screw 27. The opposite end of flat torque spring 40 is connected to shaft 34 with a roll pin 37. An annular spacer 35 is mounted on shaft 34 between flat torque spring 40 and shaft 34 and provides secure alignment of flat torque spring 40 with shaft 34. The flat torque spring 40 is a spiral, coiled spring having a rectangular cross section. The spring 40 is mounted so as to bias spool 32 to retrieve cable 38 to ensure such that cable 38 retains its precision coiled alignment about spool diameter 32a.

The spring torque is such that it resists the rotation of motor shaft 34 and the attached spool 32 by applying a torque on the motor shaft 34.

Looking at FIG. 2, it can be seen that flat torque spring 40 tends to rotate precision spool 32 in a counterclockwise direction. As such, the flat torque spring 40 is biased to retrieve and coil cable 38 about precision spool 32. Whereas, tension on cable 38 tends to extend and uncoil cable 38 from precision spool 32 and thereby rotate shaft 34 in a clockwise direction.

A cover plate 42 having a central opening 42a is securely mounted adjacent the lower end of frame member 10 with a pair of threaded fasteners (not shown in FIG. 1). Motor shaft 34 extends through opening 42a and a shaft bearing 36b is mounted therebetween to centralize the motor shaft 34 and to minimize the resistance to rotating friction. Shaft bearing 36b is a journal type bearing and is preferably "DELREN", "NYLATRON", "TEFLON" or the like or may be a ball bearing depending on the environmental parameters of temperature and the like. Motor shaft 34 extends a predetermined distance beyond the cover plate 42.

A mounting bracket 44 is securely fastened to the cover plate 42 with a plurality of fasteners 46. Mounting bracket 44 includes a flange portion 44a, a cylindrical portion 44b and an end portion 44c. Further, mounting bracket 44 has a central opening 44d on end portion 44c to receive a signal encoder 48 as will be more fully discussed below.

The displacement sensor S further includes the signal encoder 48. The signal encoder 48 is securely attached to the mounting bracket 44 with threaded fasteners or the like and signal encoder 48 includes a signal encoder shaft 48a extending through central opening 44d a predetermined distance. Shaft 48a is coupled with motor shaft 34 with flexible coupling 50.

Signal encoder 48 in a first embodiment is a precision multiturn potentiometer of the type commercially available, such as Bourns Instrument Company part No. 3541-S-435-502. Signal encoder 48 is a multiturn potentiometer since the linear displacement of the cable 38 must be an integral multiple of the rotation of the potentiometer. The rotation of potentiometer is directly related to the diameter of the spool 32. With singleturn potentiometers a larger diameter spool is required to achieve integral multiples of the potentiometer rotation than with a multiturn potentiometer. Flat torque spring 40 cooperates with signal encoder 48 to generate an output signal that preferably is linearly proportional to the relative extension of cable 38.

A second embodiment of signal encoder 48 is a precision optical encoder such as Model No. L25G-F1-SB-1200-AB-7406R-LED-SCI8 manufactured by Baldwin Electronics, Inc. Such optical encoders develop an output signal which is proportional to the extension of cable 38. Internally and not shown, such optical encoders include a light source, a photo sensitive cell and a rotating disc with slots about its circumference. Rotation of the disc connected to shaft 34 develops light pulses in response to extension of cable 38 which are sensed by the photo cell and a linear output signal is generated therefrom.

Signal encoder 48 is electrically connected to signal connector 56 such that the output signal of the signal encoder 48 is further conveyed to a processing circuit C.

Flexible coupling 50 is a universal type joint permitting misalignment of shaft 34 and signal encoder shaft 48a. Flexible coupling 50 extends the operable life of signal encoder 48 and enhances its precision and accuracy by inhibiting side loads or bias on shaft 48a.

The displacement transducer T-1 thus far described uniquely specifies a coaxially aligned extensometer M flexibly coupled with a signal encoder 48, and structurally mounting the extensometer M with the frame member 10, cover plate 42 and support bracket 44 to centralize the extensometer M and attached signal encoder 48 thereby eliminating dead bands and side loading on the signal encoder 48. Thus, displacement of wire cable 38 activates the signal encoder 48 to generate an electrical output signal that is linearly proportional thereto. The displacement transducer T-1 thus configured is capable of operating accurately and precisely under the influence of gravitational accelerational loads of up to 13,500 G, oscillations of 1100 hertz and in operating temperatures of 700° F. for up to 90 seconds.

A second embodiment of the displacement transducer T-2 is shown in FIG. 3. The second embodiment of the displacement transducer T-2 is similar to the first embodiment T-1, having a displacement sensor S comprised of an extensometer M flexibly coupled with a signal encoder 48 rotatably mounted with frame member 10. The operation and performance of the displacement sensor S is identical to that described above in the displacement transducer embodiment T-1.

However, displacement transducer T-2 has a housing H-1 which protectively encapsulates only the signal encoder 48 from an adverse environment, which may include water or any other degrading atmosphere, while the precision spool 32 and cable 38 are exposed to such environment. Housing H-1 includes an end sleeve 52 and a shroud 29 adapted to mate with frame member 10. End sleeve 52 is similar in structure and function to that of embodiment T-1. A mounting ring 31a is disposed between the frame member 10 and shroud 29 to secure shroud 29 with frame member 10. Shroud 29 has a first end 29a which is formed of a suitable screen or grid-like material. Thus, the spool cavity 14 is therefore in direct communication with the adverse environment.

Guide block 22, previously described, is mounted concentric with portal 20 on shroud 29. The mounting of guide block 22 and portal 20 have the aforementioned axial and tangential relation to precision spool 32.

A third embodiment the displacement transducer T-3 is shown in FIG. 4. Transducer T-3 includes an angular displacement sensor A ruggedly mounted in housing H to accurately monitor the relative angular displacement with respect to another object (not shown).

The angular displacement sensor A includes an extensometer M flexibly coupled with a signal encoder 48. The extensometer M comprises a shaft 34 and a radial arm 138 attached to shaft upper end 34a. Radial arm 138 provides means for rotating in response to the relative angular displacement between two objects. One end of radial arm 138 is mounted transversely to the longitudinal axis of shaft 34 and the other end is attached and/or abuts to an object (not shown) for which the measurement of the relative angular displacement is desired. Radial arm 138 is rigidly secured to shaft 34 with a set screw 127.

The extensometer M further includes an annular spacer 102 having a central bore 102a. The annular spacer 102 is concentrically mounted with the shaft 34 such that shaft 34 passes through spacer bore 102a.

The extensometer M also includes a return spring 140 mounted concentrically with the shaft 34 and exterior of the annular spacer 102. The return spring 140 is a cylindrical, helical type spring having a circular cross section. One end of return spring 140 is mounted with arm 138 and the other with housing H-2 so as to bias arm 138 to a fixed, relative angular position. With radial arm 138 secured to shaft 34, the annular spacer 102 and return spring 140 are securely retained with the housing H-2.

Flexibly coupled with the shaft 34 is a signal encoder 48 of the type previously described. Annular spacer 102 ensures the proper positioning of the return spring 140 about the shaft 34 and inhibits side loadings on shaft 34, and hence ensures the linearity of signal encoder 48.

Housing H-2 provides a structure for protectively encapsulating the signal encoder 48 and rotatably supporting the extensometer M. Housing H-2 is preferably cylindrical and includes a frame member 100 having a central bore 100a. Shaft 34 is mounted in bore 100a and bearings 136 are disposed in bore 100a between the shaft 34 and frame member 100 to centralize the shaft 34 and reduce the resistance to rotational friction. Bearings 136 are preferably "DELREN", "NYLATRON", "TEFLON" or the like.

Housing H-2 also includes an end cap 128 having a central bore 128a for rotatably receiving shaft 34. End cap 128 is mounted with frame member 100 by fasteners 101. Bore 128a has disposed therein bearing 136a between the shaft 34 and end cap 128 to centralize shaft 34 and to reduce the resistance to rotational friction. Bearing 136a is preferably "DELREN", "NYLATRON", "TEFLON" or the like.

Sealing rings 132 are disposed with end cap 128 to prevent fluid migration between the shaft 34 and end cap 128 and between end cap 128 and frame member 100. End cap 128 has an opening 128b to securely receive one end of return spring 140.

A bracket 44 having a central opening 44a is mounted with frame member 100 by fasteners 46. Signal encoder 48 is mounted with bracket 44 and shaft 48a extends through the opening 44a. Signal encoder 48 is thus securely mounted with frame member 100.

Flexible coupling 50 rotatably connects shaft 34 and signal encoder 48. The flexible coupling 50 is of the universal joint type to inhibit side loading on signal encoder 48 and thus increases the linear accuracy and operating life of the signal encoder 48.

Housing H-2 further includes a sleeve 52. Sleeve 52 is preferably threadedly received with frame member 100 to encapsulate and protect signal encoder 48 from extreme environmental conditions and severe mechanical loading. Sealing ring 51a is disposed between frame member 100 and sleeve 52 to inhibit fluid migration therebetween. Sleeve 52 facilitates ready access and repair of the signal encoder 48.

Sleeve 52 includes an end piece 54 threadably mated thereto whereby ready access is possible to repair or perform maintenance on the signal encoder 48. Sealing ring 51b is disposed between sleeve 52 and end piece 54 to inhibit fluid migration therebetween and into. A signal connector 56 is mounted with end piece 54 to further transmit an output signal of the signal encoder 48 to a processing circuit, similar to that shown in FIG. 1.

METHOD OF OPERATION

In the preferred embodiment, the displacement transducer T-1 is mounted with a first object (not shown) and displacement cable 38 is attached to a second object (not shown) for which a measurement of the relative displacement and rate of change of displacement is desired. Conceptually, such configuration would include adjacent separable stages of a rocket subject to severe mechanical loading conditions as well as extreme temperature excursions. With one end of cable 38 attached to the second object and the other end to precision spool 32, changes in the relative distance between both objects causes cable 38 to pay off/on of spool 32 which thereby rotates in response thereto. By differentiating the distance information over time, velocity information may also be ascertained.

Since guide block bore 22a and portal 20 are tangentially aligned with spool 32 and further both are spaced axially with respect to the longitudinal axis of spool 32 to limit the angle of departure $\theta$ between cable 38 and spool 32, the cable 38 is reeled off/on spool 32 in adjacent coils without overlapping. Such precision coiling of cable 38 about spool 32 is essential to ensure that the relative displacement of cable 38 produces a rotary motion linearly proportional thereto.

The linear rotation of spool 32 is further conveyed to the signal encoder 48 by shaft 34 flexibly coupled thereto which processes this rotary motion into an electrical output signal linearly proportional to the displacement of cable 38. It is further understood that the precision and accuracy of such electrical signal is dependent upon the inhibition of mechanical side loadings on both motor shaft 34 and potentiometer shaft 48a. Bearings 36a/36b support motor shaft 34 substantially along its length to inhibit side loadings thereon. Mounting bracket 44 positions signal encoder 48 in axial alignment with shaft 34. Flexible coupling 50 further inhibits side loadings on encoder shaft 48a thus ensuring a precision output signal under a broad range of external mechanical loadings.

Moreover, housing H in cooperation with frame member 10 protectively encapsulates the displacement sensor S from extreme environmental conditions which can degrade the performance and precision of the output signal of signal encoder 48.

The output signal thus generated is thence conveyed for further processing in the processing circuit C to compute both relative displacement and the rate of change of displacement, as may be needed.

The displacement transducer T-1 is generally cylindrical in shape permitting its placement on board vehicles requiring space optimization.

The displacement transducer of the present invention can most advantageously be used where large gravitational accelerations, oscillations and degrading environmental conditions are experienced, (e.g. rocket stage separation, subsea platforms) and a need for precision displacement data exists.

The displacement transducer T of the present invention provides a device for the precision measurement of relative linear and angular displacement. Because the displacement sensor S is ruggedly supported, inaccuracies due to side loadings which can normally be expected to bias the output signal of signal encoder 48 are effectively inhibited. The displacement transducer T discloses a novel structure for operably withstanding large gravitational accelerations, oscillations and extreme environmental conditions and still develop precise and accurate relative displacement signals. Moreover, the structural configuration enhances the multiplicity of applications of the displacement transducer T to include those where space availability is strictly limited.

The invention being thus described, it will be obvious that variations thereof may be made. Such variations are not regarded as a departure from the spirit and scope of the invention.

I claim:

1. An improved displacement transducer for accurately measuring relative displacement between two objects under severe mechanical loading and extreme environmental conditions, comprising, in combination:
   a frame member adapted to be mounted on one of the two objects;
   a displacement sensor assembly mounted on said frame member, said sensor assembly including:
   an extensometer having a rotatable member mounted for rotation with respect to said frame member and adapted to be coupled in displacement responsive relation to the other object with respect to which relative displacement is sought to be accurately measured;
   a signal encoder mounted on said frame member, said signal encoder having a rotatable shaft and means coupled to said shaft for producing an electrical signal in response to rotation of said shaft; and,
   torque transmitting means mechanically coupling the rotatable member of said extensometer in driving relation to the rotatable shaft of said signal encoder, said torque transmitting means including a rigid shaft member and a flexible coupling member joined together in series mechanical relation.

2. An improved displacement transducer as defined in claim 1, the combination including an annular bearing member interposed between said frame and said rigid shaft member, said annular bearing member supporting said rigid shaft member for rotatable movement, and said bearing member supporting said rigid shaft member against radial deflection forces imparted thereto by external mechanical loading conditions.

3. An improved displacement transducer as defined in claim 2, wherein:
   said annular bearing means includes a first annular bearing member and a second annular bearing member axially spaced with respect to said first annular bearing member; and
   a torque retrieval spring concentrically disposed about said rigid shaft member and intermediate said first and second annular bearing members, said spring member having a first end portion coupled to said rigid shaft member and having an opposite end thereof coupled to said frame member, said torque retrieval spring adapted to apply a bias force yieldably opposing rotation of said rigid shaft member.

4. An improved displacement transducer as defined in claim 1, the combination including:
   an annular spacer concentrically disposed about said rigid shaft member and interposed between the rotatable member and said frame;

a return spring concentrically disposed about said annular spacer, said return spring having a first end portion attached to said rotatable member, and a second end portion attached to said frame.

5. An improved displacement transducer as defined in claim 4,
said rotatable member including a rotation arm mounted onto said rigid shaft member, said annular spacer being axially confined between said rotation arm and said frame.

6. An improved displacement transducer as defined in claim 1, wherein:
said frame having portions defining a pocket;
a bracket assembly received within said pocket and attached to said frame, said bracket assembly having a tubular housing member extending axially within said pocket; and,
said signal encoder being disposed within said pocket and being mounted onto an end portion of said tubular housing member.

7. An improved displacement transducer as defined in claim 6, said flexible coupling member being disposed within said tubular housing member.

* * * * *